United States Patent [19]

Hasebe et al.

[11] Patent Number: 5,219,678
[45] Date of Patent: Jun. 15, 1993

[54] NICKEL-METAL HYDRIDE SECONDARY CELL, AND METHOD OF MANUFACTURING THE SAME, HYDROGEN ABSORBING ALLOY PARTICLES FOR CELL, METHOD OF MANUFACTURING THE SAME

[75] Inventors: Hiroyuki Hasebe; Naoyuki Sori; Tomohisa Arai, all of Yokohama, Japan

[73] Assignee: Kabushiki Kaisha Toshiba, Kawasaki, Japan

[21] Appl. No.: 588,927

[22] Filed: Sep. 27, 1990

[30] Foreign Application Priority Data

Sep. 29, 1989 [JP] Japan .................. 1-254924

[51] Int. Cl.$^5$ ........................... H01M 10/34
[52] U.S. Cl. ..................... 429/59; 429/223; 420/416; 420/455; 420/900
[58] Field of Search .............. 429/59, 223; 420/416, 420/455, 900

[56] References Cited

U.S. PATENT DOCUMENTS

| | | | |
|---|---|---|---|
| 4,004,943 | 1/1977 | Boter | 429/59 |
| 4,009,223 | 2/1977 | Cloran et al. | 264/10 |
| 4,605,603 | 8/1986 | Kanda et al. | 429/59 |
| 4,915,898 | 4/1990 | Wolff et al. | 419/3 |
| 4,925,748 | 5/1990 | Ikoma et al. | 429/59 |
| 4,983,474 | 1/1991 | Doi et al. | 429/59 |

FOREIGN PATENT DOCUMENTS

| | | |
|---|---|---|
| 0140693 | 5/1985 | European Pat. Off. |
| 0411591 | 2/1991 | European Pat. Off. |
| 4007573 | 9/1990 | Fed. Rep. of Germany |
| 64-75608 | 3/1989 | Japan |

OTHER PUBLICATIONS

Patent Abstracts of Japan M842 vol. 13, No. 281 p. 151 Jun. 27, 1989.
Chemical Abstracts, vol. 109, No. 22, Nov. 28, 1988, abstract No. 193811R, K. Shidori, et al., "Hydrogen-Absorbing Alloy Members and Their Manufacture for Battery Anodes", p. 218, & JP-A-63 162830, Jul. 6 1988.
Chemical Abstracts, vol. 103, No. 20, Nov. 18, 1985, abstract No. 163556V, Matsushita Electric Industrial Co., "Hydrogen-Absorbing Anode", p. 187, & JP-A-60 109174, Jun. 14, 1985.
Patent Abstracts of Japan, vol. 9, No. 274, (E-354) (1997), Oct. 31, 1985, & JP-A-60 119079, Jun. 26, 1985, N. Yanagihara, et al., "Hydrogen Absorption Electrode".
Patent Abstracts of Japan, vol. 8, No. 69, (M-286), Mar. 31, 1984, & JP-A-58 217609, Dec. 17, 1983, Y. Sasaki, et al., "Formation of Oxygen-Contg. Hydrogen-Occluding Alloy into Powdery or Flaked State", & Chemical Abstract 177864u.
Patent Abstracts of Japan, vol. 12, No. 36 (M-664), Feb. 3, 1988, & JP-A-62 188 702, Aug. 18, 1987, A. Horata, "Powder Molding Method".
Patent Abstracts of Japan, vol. 14, No. 580, (E-101), Dec. 25, 1990, & JP-A-02 253 558, Oct. 12, 1990, T. Murata, "Manufacture of Hydrogen-Absorbing Electrodes".

*Primary Examiner*—R. Bruce Breneman
*Attorney, Agent, or Firm*—Oblon, Spivak, McClelland, Maier & Neustadt

[57] ABSTRACT

A nickel-metal hydride secondary cell, comprising a hydrogen absorbing alloy negative electrode accommodated in an enclosure and containing spherical hydrogen absorbing alloy particles covered with a free cooling surface and having an average particle diameter of 1 to 100 μm, a non-sintered type nickel positive electrode disposed within the enclosure and positioned to face the negative electrode with a separator interposed therebetween, and an alkaline electrolyte poured in the enclosure.

23 Claims, 4 Drawing Sheets

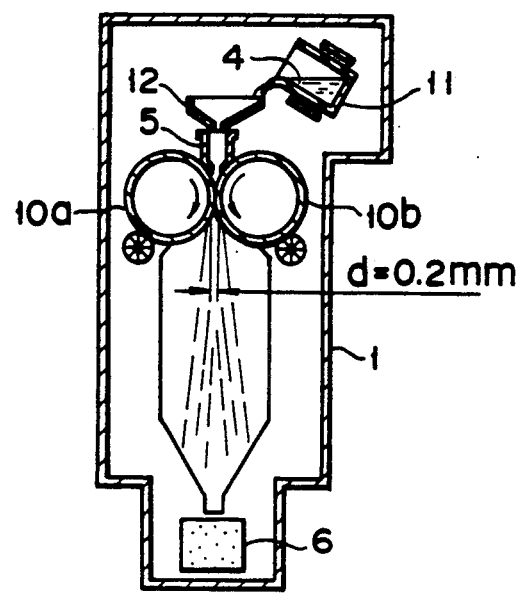
F I G. 4
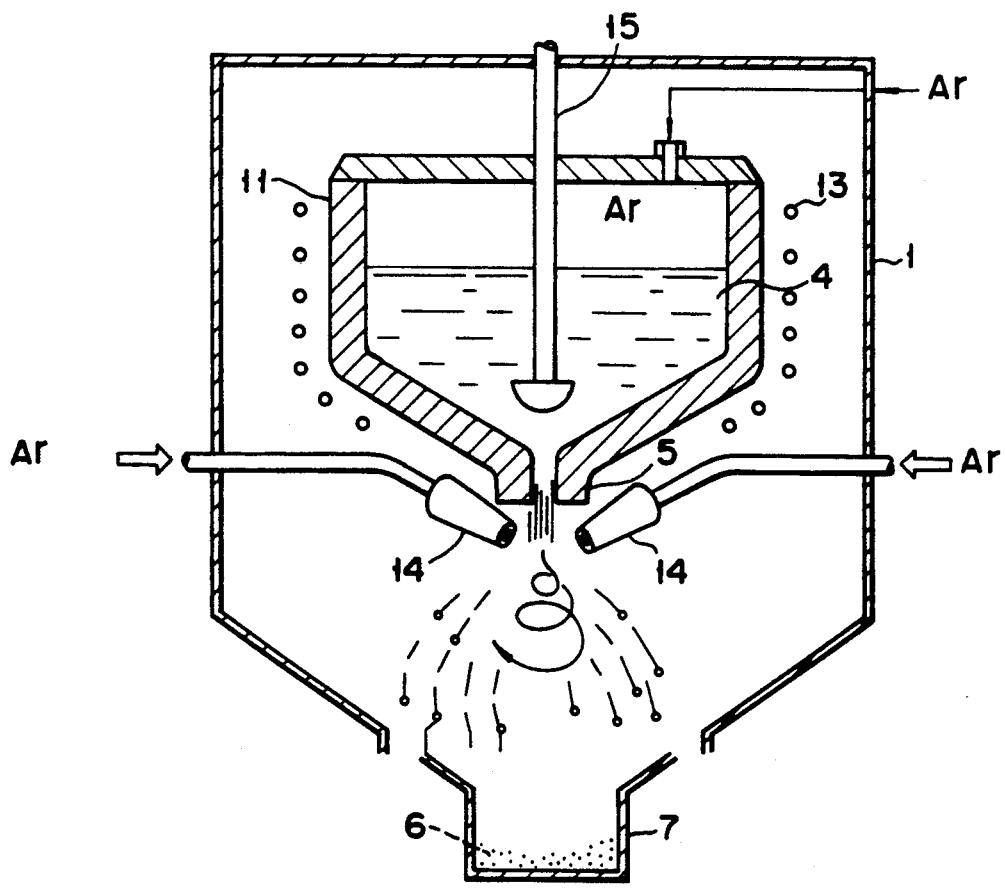
F I G. 5

NICKEL-METAL HYDRIDE SECONDARY CELL, AND METHOD OF MANUFACTURING THE SAME, HYDROGEN ABSORBING ALLOY PARTICLES FOR CELL, METHOD OF MANUFACTURING THE SAME

BACKGROUND OF THE INVENTION

1. Field of the Invention

The present invention relates to a nickel-metal hydride secondary cell comprising a negative electrode containing hydrogen absorbing alloy particles, a method of manufacturing said cell, hydrogen absorbing alloy particles for cells, and a method of manufacturing said particles.

2. Description of the Related Art

The prominent progress made recently in the electronic technology has achieved a prominent power saving. The recent progress in the mounting technique is also outstanding. As a result, the electronic apparatus has been prominently miniaturized and made portable. Naturally, high demands are being raised for the increase in the capacity of the secondary cell which is incorporated as the power source into the electronic apparatus. Proposed as such a secondary cell is an alkali secondary cell constructed such that hydrogen absorbing alloy particles forming the negative electrode of the cell are fixed to a conductive core acting as a current collector. The alkali secondary cell of this construction has began to attract attentions in this technical field. An $AB_5$ type alloy represented by $LaNi_5$ is a typical example of the hydrogen absorbing alloy. The negative electrode using the $AB_5$ type alloy is advantageous over the negative electrode formed of a typical conventional material of cadmium in terms of the unit weight or energy density per unit volume of the alkali secondary cell. It follows that the use of the $AB_5$ type alloy makes it possible to increase the cell capacity Also, the use of the $AB_5$ type alloy is substantially free from the environmental pollution problem. In addition, the alkali secondary cell using the $AB_5$ type alloy exhibits excellent cell characteristics.

However, the negative electrode containing the hydrogen absorbing alloy particles gives rise to the problem that the volume of the negative electrode is expanded or shrunk when hydrogen is absorbed by or released from the hydrogen absorbing alloy particles during the charging/discharging step of the cell, with the result that the hydrogen absorbing alloy particles are cracked, leading to pulverization of the particles. In accordance with the progress in the pulverization of the hydrogen absorbing alloy particles, the specific surface area of the hydrogen absorbing alloy particles is rapidly increased. Naturally, the surface of the alloy particle is in contact with an alkaline electrolyte and, thus, is deteriorated with time. It follows that the pulverization causes an increased ratio of the deteriorated region to the entire region of the hydrogen absorbing alloy particles. In addition, the electrical conductivity between the hydrogen absorbing alloy particles and the current conductor is deteriorated, leading to deterioration in the electrode characteristics and to reduction in the cycle life.

Various measures are proposed in an attempt to overcome the above-noted difficulty. For example, it is proposed to form a thin nickel film on the surface of the hydrogen absorbing alloy particle by means of plating or vapor deposition so as to increase the mechanical strength of the alloy particle and, thus, to prevent the alloy particle from being cracked. It is also proposed to dip the hydrogen absorbing alloy particles in an alkaline solution, followed by drying the alloy particles so as to suppress the deterioration in the surface of the hydrogen absorbing alloy particle. However, any of these conventional measures fails to achieve a sufficient improvement of the difficulty.

On the other hand, a pulverizing step is required for preparation of hydrogen absorbing alloy particles of uniform particle size in the manufacture of a negative electrode containing the hydrogen absorbing alloy particles. The conventional methods of pulverizing the hydrogen absorbing alloy include, for example, a method in which hydrogen is absorbed by and released from an ingot of the hydrogen absorbing alloy so as to pulverize the ingot and a mechanical pulverizing method using, for example, a ball mill or a cutter mill.

However, the method in which hydrogen is absorbed by and released from an ingot of the hydrogen absorbing alloy is defective in that the hydrogen absorbing alloy particles tend to be ignited if the hydrogen withdrawal after the pulverization is incomplete In addition, only a slight nonuniformity of the alloy composition causes the pulverized alloy particles to be different from each other in the particle size, leading to a low yield in the subsequent step of classification of the pulverized particles. The mechanical pulverizing method is also defective in that the particle size distribution of the pulverized particles tends to be very broad, making it necessary to employ classification after the pulverizing step. The classifying operation leads to a marked reduction in the yield. In addition, fine particles having a particle diameter of 1 $\mu$m or less are likely to be formed in the case of employing the mechanical pulverizing method. Naturally, the cell characteristics are adversely affected when the hydrogen absorbing alloy particles prepared by the mechanical pulverizing method are used for preparing the negative electrode. What should also be noted is that a cast ingot is used as the starting material in any of the conventional pulverizing methods described above. Thus, it is necessary to employ a heat treatment for homogenization in order to suppress the segregation in the casting step. Also, it is very difficult to eliminate the micro segregation in spite of the heat treatment for homogenization. The micro segregation causes the formation of a local cell and, thus, the corrosion proceeds. Also, the segregation at the grain boundary causes reduction in the mechanical strength of the alloy particles so as to bring about pulverization of the alloy particles. Such being the situation, the cell characteristics are deteriorated with time when it comes to the conventional secondary cell utilizing the hydrogen absorbing alloy particles.

SUMMARY OF THE INVENTION

An object of the present invention is to provide hydrogen absorbing alloy particles which are not corroded by an alkaline electrolyte and which permit suppressing the pulverization caused by the absorption/release of hydrogen.

Another object is to provide method of manufacturing hydrogen absorbing alloy particles adapted for use in a cell, said hydrogen absorbing alloy particles being excellent in the smoothness of the surface, substantially free from cracks in the surface, high in the grain boundary strength, uniform in texture, excellent in corrosion resistance when brought into contact with an alkaline electrolyte, and unlikely to be pulverized when absorbing/releasing hydrogen.

Another object is to provide a method of manufacturing hydrogen absorbing alloy particles adapted for use in a cell, said alloy particles having a small crystal grain diameter, having a large grain boundary area which provides the path for the diffusion and migration of hydrogen, and exhibiting a high hydrogen absorption rate.

Another object is to provide a nickel-metal hydride secondary cell comprising a negative electrode which contains hydrogen absorbing alloy particles which are unlikely to be pulverized in spite of repetition of the charging/discharging operations of the cell and which are unlikely to be corroded by an alkaline electrolyte, said secondary cell exhibiting a long life in respect of the charging/discharging cycles and having a large cell capacity.

Still another object is to provide a method which permits manufacturing a nickel-metal hydride secondary cell exhibiting a long life in respect of the charging/discharging cycles and having a large cell capacity, said method comprising the steps of preparing a negative electrode containing hydrogen absorbing alloy particles which are unlikely to be pulverized in spite of repetition of the charging/discharging operations of the cell and which are unlikely to be corroded by an alkaline electrolyte, and positioning the negative electrode in an enclosure together with a positive electrode and a separator.

The present invention is featured in that the hydrogen absorbing alloy particles used for forming a cell are spherical, are covered with a free cooling surface, and have an average particle diameter of 1 to 100 μm.

According to the present invention, there is provided a method of manufacturing hydrogen absorbing alloy particles, comprising the steps of:

preparing a melt of a hydrogen absorbing alloy;

supplying the molten hydrogen absorbing alloy to the running surface of a rotor running at a high speed said rotor being disposed under vacuum or under a cooling gas atmosphere, so as to permit the molten hydrogen absorbing alloy to be dispersed in the form of fine particles by the kinetic energy of the rotor and, at the same time, to be solidified rapidly.

The present invention also provides a nickel-metal hydride secondary cell, comprising:

a negative electrode accommodated in an enclosure and containing hydrogen absorbing alloy spherical particles covered with a free cooling surface and having an average particle diameter of 1 to 100 μm;

a non-sintered type nickel positive electrode accommodated in the enclosure in a manner to face the negative electrode with a separator interposed therebetween; and an alkaline electrolyte poured in the enclosure.

Further, the present invention provides a method of manufacturing a nickel-metal hydride secondary cell, comprising the steps of:

preparing hydrogen absorbing alloy particles covered with a free cooling surface and having an average particle diameter of 1 to 100 μm by supplying a melt of a molten hydrogen absorbing alloy to the running surface of a rotor running at a high speed, said rotor being disposed under vacuum or under a cooling gas atmosphere, so as to permit the molten hydrogen absorbing alloy to be dispersed in the form of fine particles by the kinetic energy of the rotor and, at the same time, to be solidified rapidly;

preparing a paste of the hydrogen absorbing alloy particles by kneading a mixture of the alloy particles with a binding medium without exposing the hydrogen absorbing alloy particles to the air atmosphere;

preparing a negative electrode of the hydrogen absorbing alloy by forming a layer of the paste on an electrically conductive core, drying the paste layer and subsequently applying a roller press to the paste layer;

preparing a non-sintered nickel positive electrode by preparing a paste having nickel hydroxide powder dispersed in a binding medium, forming a layer of the paste on an electrically conductive core and subsequently drying the paste layer;

accommodating the negative electrode containing the hydrogen absorbing alloy and the non-sintered type nickel positive electrode in an enclosure with a separator interposed therebetween; and pouring an alkaline electrolyte into the enclosure.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a cross sectional view schematically showing an apparatus for manufacturing hydrogen absorbing alloy particles by a twin roll method employed in the present invention;

FIG. 5 is a cross sectional view schematically showing an apparatus for manufacturing hydrogen absorbing alloy particles by an inert gas atomizing method employed in the present invention.

DETAILED DESCRIPTION OF THE PREFERRED EMBODIMENTS

Figure 1:
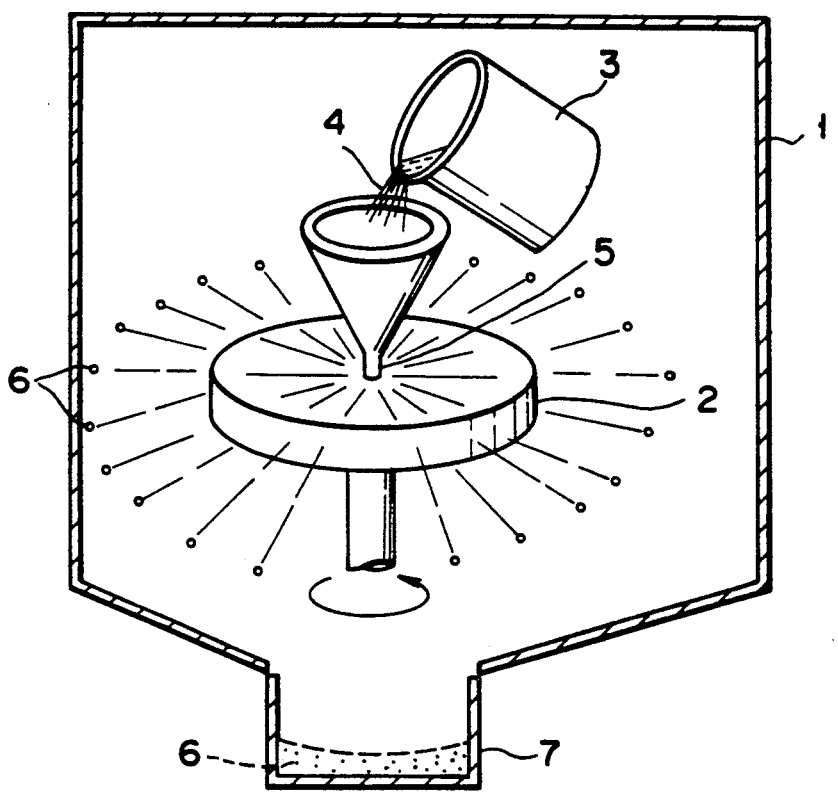
FIG. 1 is a cross sectional view schematically showing an apparatus for manufacturing hydrogen absorbing alloy particles by a rotary disk method employed in the present invention.

The present invention provides spherical particles of hydrogen absorbing alloy for a cell. The alloy particles of the present invention are featured in that the particles are covered with a free cooling surface and have an average particle diameter of 1 to 100 μm. In the present invention, it is desirable to use a hydrogen absorbing alloy represented by the general formula $XY_{5-a}Z_a$, where "X" is a rare earth element including La, "Y" is Ni, and "Z" is at least one element selected from the group consisting of Co, Mn, Al, V, Cu and B, and "a" is: $0 \leq a < 2$.

The term "spherical alloy particles covered with a free cooling surface" denotes that the alloy particle is covered with a continuous curved surface which does not have an edge portion and a ridge. It is desirable for the hydrogen absorbing alloy to have a structure in which the crystal grain diameter is 50 μm or less It should be noted that the hydrogen absorbing alloy particles may have a structure consisting of only monocrystals having the crystal grain diameter noted above or a structure in which a non-crystalline portion is mixed with the monocrystalline portion. If the crystal grain diameter of the hydrogen absorbing alloy exceeds 50 μm, the hydrogen absorbing alloy particles tend to be corroded by an alkaline electrolyte. Also, when the hydrogen absorbing alloy particles are used for forming a negative electrode, the electrochemical properties of the cell are likely to be deteriorated.

As described above, it is necessary for the hydrogen absorbing alloy particles of the present invention to have an average particle diameter of 1 to 100 μm. If the average particle diameter is less than 1 μm, the alloy particles have an excessively large specific surface area, resulting in a low corrosion resistance of the negative electrode prepared by using the hydrogen absorbing alloy particles. On the other hand, the average particle diameter exceeds 100 μm, brings about reduction in the voltage of the secondary cell comprising a negative electrode prepared by using the hydrogen absorbing alloy particles. The reduction in the cell voltage is prominent where discharge of the cell is carried out at a high rate. It is desirable for the hydrogen absorbing alloy particle to have an average particle falling within the range of between 5 μm and 50 μm. It is particularly desirable for the hydrogen absorbing alloy particles to include at least 70% of particles whose average particle diameter is (1 to 100 μm)±10%. If this requirement is not satisfied, the secondary cell comprising a negative electrode prepared by using the hydrogen absorbing alloy particles is likely to be lowered in the life in terms of the charging/discharging cycles and in the battery capacity.

It is desirable for the hydrogen absorbing alloy particles to have a ratio of the short diameter to the long diameter of at least 1/5. If this ratio is less than 1/5, the density of the alloy particles tends to be lowered in the negative electrode prepared by using the hydrogen absorbing alloy particles. Preferably, the ratio of the short diameter to the long diameter should be ½ or more.

Further, it is desirable for the hydrogen absorbing alloy particles to have a smooth surface. To be more specific, the depth of the concave portion or the height of the convex portion of the spherical particle with respect to the outer contour of the particle should be 20% or less of an average diameter of the particle. Also, the depth or height noted above should not exceed 50 μm. In addition, the hydrogen absorbing alloy particles should include at least 80% of the particles meeting the above-noted conditions of the surface coarseness. If the depth or height noted above exceeds 20% of the average diameter of the particle, the negative electrode prepared by using the hydrogen absorbing alloy particles gives rise to the defect that a current concentration tends to take place in the charging/discharging step of the secondary cell. It follows that, where the alloy particles include more than 20% of the particles in which the depth or height noted above exceed 20% of the average diameter of the particle, the electrode prepared by using the hydrogen absorbing alloy particles gives rise to the defect that the hydrogen absorption is locally concentrated so as to promote pulverization of the alloy particles.

Let us describe how to manufacture the hydrogen absorbing alloy particles of the present invention with reference to FIGS. 1 to 5:

(1) Rotary Disk Method:

FIG. 1 shows an apparatus for manufacturing hydrogen absorbing alloy particles of the present invention by the rotary disk method. As seen from the drawing, the apparatus comprises a cooling chamber 1 filled with a helium gas atmosphere, a disk-like rotor 2 disposed within the chamber 1 and rotated at a high speed, and a pouring nozzle 5 serving to temporarily store a melt 4 of a hydrogen absorbing alloy supplied from a ladle 3 and to spurt the melt 4 onto the running surface of the disk-like rotor 2.

The rotor 2 is formed of a ceramic or metallic material having a relatively low wettability with the melt in order to prevent the molten hydrogen absorbing alloy from being attached to and solidified on the surface of the rotor 2.

In the manufacturing apparatus shown in FIG. 1, the molten hydrogen absorbing alloy 4 supplied from the ladle 3 is spurted onto the running surface of the disk-like rotor 2, with the result that the melt 4 is dispersed in the from of fine particles by the kinetic energy of the disk-like rotor 2. The dispersed particles run within the cooling chamber 1 without contacting the inner wall of the chamber 1. What should be noted is that the particles are made spherical while running within the chamber by the surface tension of the particle itself. Further, the resultant spherical particles are cooled by the atmosphere gas such as a helium gas so as to be solidified. As a result, manufactured are spherical hydrogen absorbing alloy particles 6 covered with a free cooling surface. As seen from the drawing, the hydrogen absorbing alloy particles are collected in a particle collecting vessel 7 disposed at the bottom of the cooling chamber 1.

Figure 2:
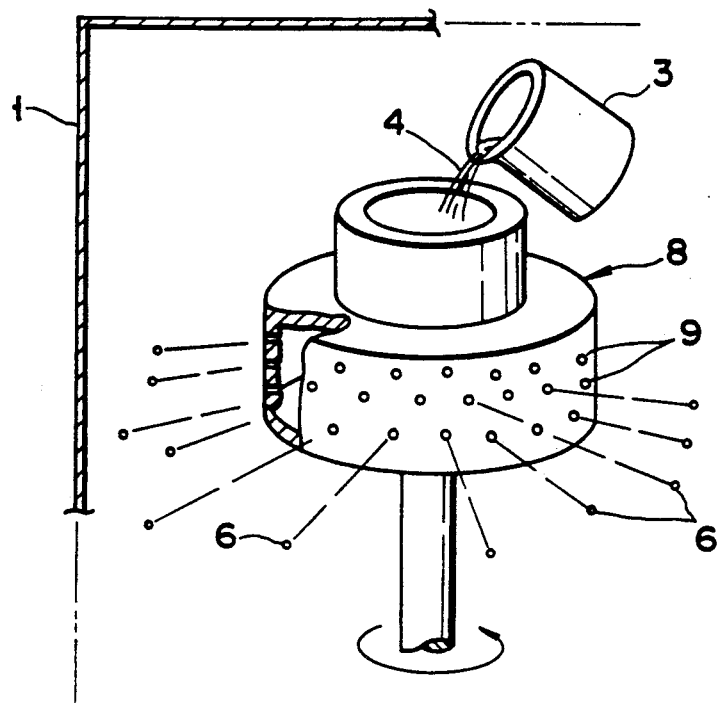
FIG. 2 is a cross sectional view schematically showing an apparatus for manufacturing hydrogen absorbing alloy particles by a rotary nozzle method employed in the present invention.

(2) Rotary Nozzle Method:

FIG. 2 shows an apparatus for manufacturing hydrogen absorbing alloy particles by the rotary nozzle method. As seen from the drawing, the apparatus comprises a cooling chamber 1 filled with a helium gas atmosphere, a rotary nozzle 8 disposed within the cooling chamber 1, and a ladle 3 for supplying a melt 4 of a hydrogen absorbing alloy to the rotary nozzle 8. The rotary nozzle 8 is in the form of a bottomed graphite cylinder having a diameter of about 100 mm. A large number of fine spurting holes 9 for spurting in the radial direction the molten hydrogen absorbing alloy 4 supplied from the ladle 3 are formed in the side wall of the rotary nozzle 8. It should be noted that the rotary nozzle is rotated at such a high speed as about 1,000 rpm. Also, the diameter of the spurting hole 9 is set at about 0.5 mm.

In the manufacturing apparatus shown in FIG. 2, the melt 4 of the hydrogen absorbing alloy supplied from the ladle 3 is poured into the rotary nozzle 8 rotated at a high speed. As a result, the melt 4 is centrifugally spurted in the radial direction from the spurting holes 9 in the form of fine particles. The spurted particles run within the cooling chamber 1 without contacting the inner wall of the chamber 1. While running within the chamber, the particles are cooled by the atmosphere gas such as a helium gas so as to be solidified. As a result, manufactured are spherical hydrogen absorbing alloy particles 6 covered with a free cooling surface.

Figure 3:
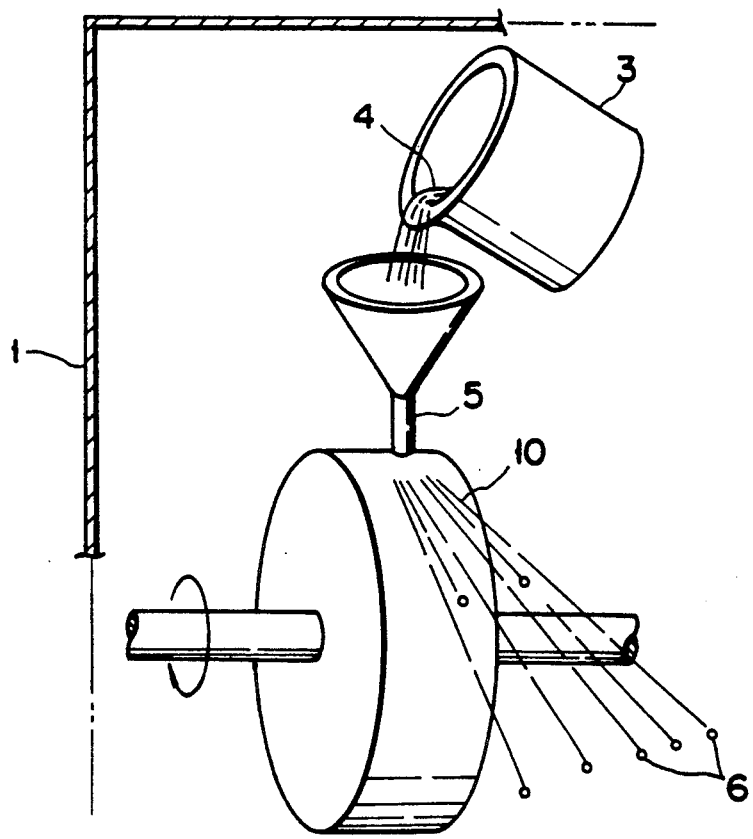
FIG. 3 is a cross sectional view schematically showing an apparatus for manufacturing hydrogen absorbing alloy particles by a single roll method employed in the present invention.

(3) Single Roll Method:

FIG. 3 shows an apparatus for manufacturing hydrogen absorbing alloy particles by the single roll method. As seen from the drawing, the manufacturing apparatus comprises a cooling chamber 1 filled with a helium gas atmosphere, an atomizing roll 10 disposed within the cooling chamber 1 and running at such a high speed as 3,000 to 5,000 rpm, and a nozzle 5 serving to temporarily store a melt 4 of a hydrogen absorbing alloy supplied from a ladle 3 and to spurt the melt 4 onto the running surface of the roll 10. The atomizing roll 10 has a diameter of about 300 mm and a flame spraying treatment of a ceramic material is applied to the surface of the roll 10.

In the manufacturing apparatus shown in FIG. 3, the molten hydrogen absorbing alloy 4 supplied from the ladle 3 is spurted from the nozzle 5 onto the running surface of the atomizing roll 10. As a result, the melt 4 is dispersed in the form of fine particles at the running surface of the roll 10. While running within the cooling chamber 1 without contacting the inner wall of the chamber 1, the particles of the hydrogen absorbing alloy are cooled and solidified. As a result, manufactured are spherical hydrogen absorbing alloy particles 6 covered with a free cooling surface.

Twin Roll Method:

FIG. 4 shows an apparatus for manufacturing hydrogen absorbing alloy particles by the twin roll method. As seen from the drawing, the manufacturing apparatus comprises a cooling chamber 1, a pair of atomizing rolls 10a and 10b disposed to face each other within the cooling chamber 1 and rotated at a high speed, a melting furnace 11 for melting the raw material metal so as to prepare a melt 4 of a hydrogen absorbing alloy, and a nozzle 5 serving to spurt through a tundish 12 the molten hydrogen absorbing alloy 4 supplied from the melting furnace 11 onto the clearance between the atomizing rolls 10a and 10b. Each of the atomizing rolls 10a and 10b is formed of, for example, a metallic cylinder having a diameter of about 50 mm and having the surface covered with a ceramic layer prepared by the flame spraying of a ceramic material. These atomizing rolls 10a, 10b are rotated at such a high speed as about 500 rpm, with such a small clearance d as about 0.05 to 0.5 mm maintained therebetween. If the clearance d between the atomizing rolls 10a and 10b is unduly small, the resultant hydrogen absorbing alloy particles are shaped flaky. To avoid the problem, the clearance d is set in general at about 0.2 mm. The drawing shows that the running surface of the atomizing roll is in parallel with the axis of rotation. In place of the atomizing roll of this type, it is possible to use a so-called "shaped roll" in which the running portion has a U- or V-shaped cross sectional shape.

In the manufacturing apparatus shown in FIG. 4, the molten hydrogen absorbing alloy 4 is spurted from the nozzle 5 toward the clearance between the atomizing rolls 10a and 10b. As a result, the melt is dispersed in the form of fine particles by the atomizing rolls and these particles are made spherical, as in the apparatus shown in FIG. 1 or FIG. 3. While running within the cooling chamber 1 without contacting the inner wall of the chamber 1, the spherical fine particles are cooled by the atmosphere gas so as to be solidified. As a result, manufactured are spherical hydrogen absorbing alloy particles 6 covered with a free cooling surface.

(5) Inert Gas Atomizing Method:

FIG. 5 shows an apparatus used for manufacturing hydrogen absorbing alloy particles by the inert gas atomizing method. As seen from the drawing, the manufacturing apparatus comprises a melting furnace 11, a melt-pouring nozzle 5 formed at the bottom of the melting furnace 11 and having an inner diameter of about 2 mm, a plurality of inert gas nozzle 14 positioned to face the lower open portion of the melt-pouring nozzle 5 for spurting a cooling inert gas such as an argon gas, and a valve 15 serving to open and close the melt-pouring nozzle 5. The melting furnace 11 housing a metallic raw material and filled with an argon gas atmosphere is disposed within a cooling chamber 1 and is heated by a heater 13 so as to melt the raw material and, thus, to prepare a molten hydrogen absorbing alloy 4.

If an argon gas of a high pressure is supplied into the melting furnace 11 housing the melt 4 of the hydrogen absorbing alloy, the surface of the melt 4 within the melting furnace 11 is pressurized, with the result that the melt 4 is spurted from the tip opening of the melt-pouring nozzle 5 disposed at the bottom of the melting furnace 11. In this step, an inert gas such as an argon gas is spurted at a high speed from the inert gas nozzles 14 positioned to face the spurted melt 4 at substantially the right angles toward the melt 4 spurted from the melt-pouring nozzle 5. As a result, the melt of the hydrogen absorbing alloy is atomized and scattered by the inert gas within the cooling chamber 1. The atomized hydrogen absorbing alloy is run downward by the whirling stream of the inert gas without contacting the inner wall of the cooling chamber 1. The atomized particles are cooled and solidified during the run within the cooling chamber so as to prepare spherical particles 6 of the hydrogen absorbing alloy covered with a free cooling surface.

Figure 6:
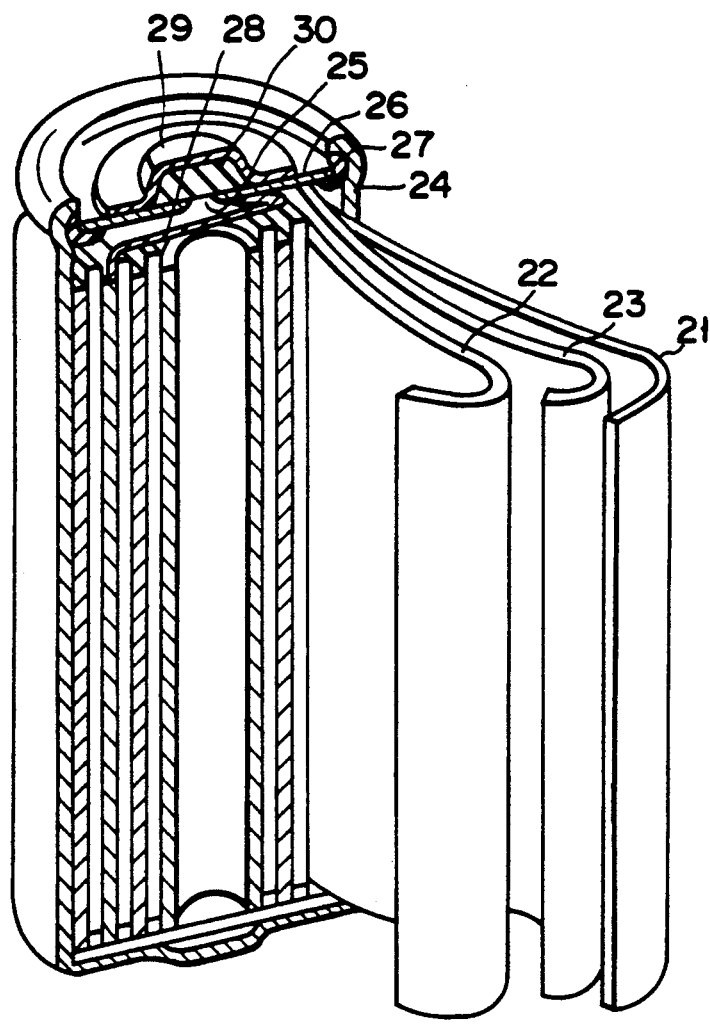
FIG. 6 is an oblique view, partly broken away, schematically showing a nickel-metal hydride secondary cell according to one embodiment of the present invention.

FIG. 6 shows the construction of a nickel-metal hydride secondary cell according to one embodiment of the present invention. As seen from the drawing, the cell comprises a negative electrode 21 containing hydrogen absorbing alloy particles, a non-sintered type nickel positive electrode 22, a separator 23 interposed between the negative and positive electrodes 21 and 22, and a bottomed cylindrical enclosure 24. These negative electrode, positive electrode and separator collectively form a laminate, and the laminate is spirally wound and accommodated in the cylindrical enclosure 24 so as to form a secondary cell. An alkaline electrolyte is housed in the enclosure 24. A circular sealing plate 26 having a hole 25 in the center is disposed to close the upper opening of the enclosure 24. A ring-like insulating gasket 27 is disposed between the periphery of the sealing plate 26 and the inner surface of the upper opening of the enclosure 24. A caulking treatment is applied in a manner to diminish the inner diameter of the upper opening of the enclosure so as to permit the sealing plate 26 to be hermetically fixed to the enclosure 24 with the gasket 27 interposed therebetween. A lead wire 28 of the positive electrode is connected at one end to the positive electrode 22 and at the other end to the lower surface of the sealing plate 26. A hat-shaped terminal 29 of the positive electrode is mounted to cover the hole 25 of the sealing plate 26. Further, a safety valve 30 made of rubber is arranged within the space defined by the sealing plate 26 and the terminal 29 of the positive electrode in a manner to close the hole 25.

The hydrogen absorbing alloy negative electrode 21 comprises the hydrogen absorbing alloy particles, a binding medium, and electrically conductive core acting as a current collector. The hydrogen absorbing alloy particles are mixed with the binding medium to prepare an effective negative electrode composition, and the composition is fixed to the conductive core so as to form the negative electrode.

The binding medium in the negative electrode include, for example, polyacrylates such as sodium polyacrylate, and potassium polyacrylate; fluorine resins such as polytetrafluoro ethylene (PTFE); and carboxymethyl cellulose (CMC). It is desirable to mix such a binding medium in an amount of 0.1 to 5 parts by weight relative to 100 parts by weight of the hydrogen absorbing alloy.

It is possible to add electrically conductive powdery materials such as carbon black and graphite to the effective negative electrode composition, if necessary. It is desirable to add such a conductive powdery material in an amount of 0.1 to 4 parts by weight relative to 100 parts by weight of the hydrogen absorbing alloy particles.

The electrically conductive core included in the negative electrode may be of a two dimensional structure such as a punched metal, expanded metal mesh, or of a three dimensional structure such as a foamed metal and a mesh-like metal fiber.

The non-sintered type nickel positive electrode 22 comprises a positive electrode composition containing a nickel hydroxide and a cobalt compound such as cobalt hydroxide or cobalt monoxide and a binding medium, and an electrically conductive core acting as a current collector. The effective composition noted above is fixed to the conductive core so as to prepare the positive electrode 22.

The binding medium in the positive electrode include, for example, polyacrylates such as sodium polyacrylate, and potassium polyacrylate; polytetrafluoro ethylene (PTFE); and carboxymethyl cellulose (CMC). It is desirable to mix such a binding medium in an amount of 0.1 to 2% by weight based on the weight of nickel hydroxide. Further, the electrically conductive core included in the positive electrode may be of a two dimensional structure such as a punched metal, expanded metal and metal mesh, or of a three dimensional structure such as a foamed metal and a mesh-like metal fiber.

The separator 23 included in the secondary cell of the present invention is formed of, for example, a polypropylene nonwoven fabric, a polyamide nonwoven fabric, or a nonwoven fabric consisting of a polypropylene fiber and a polyamide fiber. It is desirable for the separator 23 to have a thickness of 100 to 200 $\mu$m.

Used as the alkaline electrolyte housed in the enclosure 24 is a mixed solution of, for example, sodium hydroxide and lithium hydroxide, a mixed solution of potassium hydroxide and lithium hydroxide or a mixed solution of potassium hydroxide and lithium hydroxide. Particularly, it is desirable to use a mixed solution of potassium hydroxide and lithium hydroxide as the alkaline electrolyte.

In the embodiment shown in FIG. 6, a laminate consisting of the hydrogen absorbing alloy negative electrode 21, the non-sintered type nickel positive electrode 22 and the separator 23 is spirally wound and accommodated in the bottomed cylindrical enclosure 24. Alternatively, a laminate consisting of a plurality of hydrogen absorbing alloy negative electrodes, a plurality of non-sintered type nickel positive electrodes and separators each interposed between the adjacent negative and positive electrodes may be accommodated in a bottomed enclosure without spirally winding the laminate.

The nickel-metal hydride secondary cell of the present invention is manufactured as follows. In the first step, a molten hydrogen absorbing alloy is supplied to the running surface of a rotor rotated at a high speed under vacuum or a cooling gas atmosphere. As a result, the melt of the hydrogen absorbing alloy is dispersed in the form of fine particles by the kinetic energy of the rotor and, at the same time, rapidly solidified so as to prepare spherical particles of hydrogen absorbing alloy having an average particle diameter of 1 to 100 $\mu$m and covered with a free cooling surface. The hydrogen absorbing alloy particles thus prepared are mixed with a binding medium without exposing the alloy particles to the air atmosphere and with a conductive powdery material, as desired. The mixture is kneaded so as to prepare a paste, followed by forming a layer of the paste on a conductive core and subsequently loading and drying the paste layer. Finally, a roller pressing is applied to the paste layer so as to prepare the hydrogen absorbing alloy negative electrode.

On the other hand, a paste is prepared by dispersing a binding medium into a nickel hydroxide powder containing, as desired, a cobalt compound such as cobalt hydroxide or cobalt monoxide. Then a layer of the paste thus prepared is formed on a conductive core, followed by loading and drying the paste layer. Finally, a roller pressing is applied to the paste layer so as to prepare a non-sintered type nickel positive electrode.

The hydrogen absorbing alloy negative electrode and the non-sintered type nickel positive electrode thus prepared are superposed one upon the other with a separator interposed therebetween so as to prepare a laminate structure. The resultant laminate is, for example, spirally wound and accommodated in a bottomed cylindrical enclosure. Further, an alkaline electrolyte is poured into the enclosure. On the other hand, a hat-shaped positive electrode terminal is mounted to the upper surface of a sealing plate having a hole in the central portion, with a safety valve made of rubber interposed therebetween.

Then, the sealing plate is disposed to close the upper opening of the enclosure with an insulating gasket interposed therebetween. Finally, a caulking treatment is applied in a manner to diminish the inner diameter of the upper opening of the enclosure so as to hermetically fix the sealing plate to close the upper opening of the enclosure and, thus, to manufacture a nickel-metal hydride secondary cell constructed as shown in FIG. 6.

The hydrogen absorbing alloy particles for a cell according to the present invention are spherical and covered with a free cooling surface. In other words, the particle has a continuous curved surface which does not include edge portions and ridges. Also, the average particle diameter of the alloy particles of the present invention is 1 to 100 $\mu$m. These conditions make it possible to prepare a hydrogen absorbing alloy negative electrode of a large capacity having a long life in terms of the charging/discharging cycles It should be noted that a negative electrode utilizing hydrogen absorbing alloy particles having a large specific surface area has in general an increased area of interface between the electrolyte and the hydrogen absorbing alloy particles. Since the reaction site of the cell is provided by the interface noted above, an improvement in the cell characteristics can be expected. By the contrary, however, the surface of the hydrogen absorbing alloy particle is deteriorated in practice by the alkaline electrolyte. Specifically, a kind of corrosion takes place in the surface of the hydrogen absorbing alloy particle, with the result that the surface of the hydrogen absorbing alloy particle is covered the deteriorating reaction product, leading to reduction in the cell characteristics. It should also be noted that a negative electrode containing hydrogen absorbing alloy particles having a small specific surface area certainly permits reduction in the deterioration rate. In this case, however, the area of the interface between the hydrogen absorbing alloy particles and the electrolyte is diminished This also leads to deterioration of the cell characteristics.

If the secondary cell, which includes a negative electrode containing the hydrogen absorbing alloy particles of the present invention, is repeatedly subjected to the charging/discharging operations, the hydrogen absorbing alloy particles absorb hydrogen and, then, release said hydrogen, with the result that the alloy particles are repeatedly expanded and, then, shrunk. Where the surface of the hydrogen absorbing alloy particles has a low mechanical strength, or where the surface bears a large number of very fine cracks, the hydrogen absorbing alloy particles tend to be cracked in accordance with the expansion and shrinkage of the alloy particles which accompany the absorption and release of hydrogen performed by the alloy particles. If the cracking further proceeds, the hydrogen absorbing alloy particles are pulverized into fine particles. As a result, the specific surface area of the alloy particles is rapidly increased. The increase in the specific surface causes the cell characteristics to be rapidly deteriorated in accordance with increase in the number of charging/discharging operations, leading to a short life of the cell in terms of the number of charging/discharging operations.

Under the circumstances, the relationship between the specific surface area and the mechanical strength on the surface of the hydrogen absorbing alloy particles is controlled as desired in the present invention. To be more specific, the hydrogen absorbing alloy particles of the present invention are spherical. In other words, the particle has a continuous curved surface which does not have edge portions and ridges. In addition, the average particle diameter of the alloy particles are specified in the present invention. The particular shape and average particle diameter specified in the present invention make it possible to control the particular relationship noted above as desired. What should be noted is that the hydrogen absorbing alloy particles meeting the particular relationship noted above permit suppressing the corrosion of the alloy particles with an alkaline electrolyte. It follows that the hydrogen absorbing alloy particles are prevented from being expanded or shrunk in spite of the absorption and release of hydrogen during the charging/discharging operations of the secondary cell. Naturally, the pulverization of the alloy particles accompanying the expansion and shrinkage of the particles is much suppressed in the present invention. It should also be noted that the hydrogen absorbing alloy particles of the present invention have a high flowability, making it possible to improve the loading density of the alloy particles in the step of preparing a negative electrode of the secondary cell. As a result, the hydrogen absorbing alloy negative electrode is enabled to have a high cell capacity and to exhibit a long life in terms of the number of charging/discharging operations of the cell.

If the hydrogen absorbing alloy particles have edge portions and redges, a serious problem is brought about. Specifically, the current distribution is rendered nonuniform in the case of operating a secondary cell, which includes a negative electrode containing hydrogen absorbing alloy particles having edge portions and redges. What should be noted is that current concentration takes place on a large number of points on the surfaces of the hydrogen absorbing alloy particles contained in the negative electrode, with the result that the alloy particles are expanded and shrunk nonuniformly. The nonuniform expansion and shrinkage promotes the cracking of the hydrogen absorbing alloy particles. Further, it is necessary for the hydrogen absorbing alloy particles having edge portions and ridges to have a smaller average particle diameter in order to enable the alloy particles to have a specific surface area equal to that of the hydrogen absorbing alloy particles specified in the present invention. Where the particles have a smaller average particle diameter, it is very difficult to maintain a high electrical conductivity between the hydrogen absorbing alloy particles and the conductive core acting as a current collector. In other words, only a small portion of the hydrogen absorption alloy particles contained in the negative electrode is enabled to actually perform the function of the negative electrode.

In the present invention, the hydrogen absorption alloy particles are defined to have a texture in which the crystal grain diameter is 50 $\mu$m or less. Where the crystal grain diameter is as defined in the present invention, it is possible to ensure a large area of the crystal boundary along which hydrogen is readily diffused and migrated within the hydrogen absorbing alloy particles. At the same time, the hydrogen absorption rate can be improved and the composition of the alloy particles can be made uniform, leading to an improvement in the corrosion resistance.

Further, the ratio of the shorter diameter to the longer diameter of the hydrogen absorbing alloy particles is defined to be at least 1/5 in the present invention. Also, at least 80% of the alloy particles of the present invention should have a surface coarseness defined such that the depth of the concave portion or the height of the convex portion of the outer surface of the alloy particle should be 20% or less of the average particle diameter of the hydrogen absorbing alloy particles. In this case, the depth or height noted above should not exceed 5.0 $\mu$m. What is also important in the present invention is that at least 70% of the hydrogen absorbing alloy particles should have a particle diameter falling within the range of the average particle diameter (1 to 100 $\mu$m)±10%. The hydrogen absorbing alloy particles meeting these three conditions permit more prominently suppressing the corrosion with the alkaline electrolyte and the pulverization of the alloy particles caused by the charging/discharging operations of the secondary cell. It follows that the hydrogen absorbing alloy negative electrode is enabled to have a high cell capacity and to exhibit a long life in terms of the number of charging/discharging operations of the cell.

As described previously, the hydrogen absorbing alloy particles of the present invention are manufactured by a kind of rapid melt cooling method, i.e., a rotary disk method, a single roll method or a twin roll method. The alloy particles thus manufactured are spherical, covered with a free cooling surface, and have an average particle diameter of 1 to 100 μm. Compared with the hydrogen absorbing alloy particles manufactured by the conventional method such as a method in which hydrogen is absorbed and released repeatedly or by a mechanical pulverizing method, the hydrogen absorbing alloy particles of the present invention are low in the surface coarseness, negligible in the crack occurrence on the surface, high in the mechanical strength at the grain boundary, and have such a small crystal grain diameter as 50 μm or less. In addition, the hydrogen absorbing alloy particles of the present invention can be manufactured at a low cost. In the present invention, it is also possible to employ a rotary nozzle method or an inert gas atomizing method for manufacturing the hydrogen absorbing alloy particles of the prominent properties described above.

The nickel-metal hydride secondary cell of the present invention comprises a hydrogen absorbing alloy negative electrode containing the hydrogen absorbing alloy particles which permit suppressing the corrosion with an alkaline electrolyte and the pulverization caused by the charging/discharging operations of the secondary cell. In the present invention, the negative electrode noted above and a non-sintered type nickel positive electrode are accommodated in an enclosure with a separator interposed between the negative and positive electrodes. Further, an alkaline electrolyte is poured in the enclosure. The particular construction of the nickel-metal hydride secondary cell of the present invention permits increasing the cell capacity and improving the life of the cell in terms of the number of charging/discharging cycles of the cell.

Still further, the hydrogen absorbing alloy negative electrode is prepared in the present invention by kneading a mixture consisting of spherical hydrogen absorbing alloy particles and a binding medium, the alloy particles being manufactured by, for example, a rotary disk method, covered with a free cooling surface, and having an average particle diameter of 1 to 100 μm without exposing the alloy particles to the air atmosphere. A layer of a paste prepared by the kneading of the mixture noted above is formed on an electrically conductive core, followed by loading and drying the paste layer and subsequently applying a roller pressing to the paste layer. The above-noted process of preparing the hydrogen absorbing alloy negative electrode makes it possible to prepare the negative electrode without impairing the function of suppressing the corrosion with the alkaline electrolyte and the pulverization of the hydrogen absorbing alloy particles caused by the expansion and shrinkage of the alloy particles which accompany the absorption and release of hydrogen during charging/discharging operations of the cell. It follows that the present invention makes it possible to manufacture with a high reproducibility a nickel-metal hydride secondary cell of a high cell capacity having a long life in terms of the number of charging/discharging cycles of the cell.

EXAMPLE 1

Hydrogen absorbing alloy particles were manufactured by using an apparatus constructed as in FIG. 1. Specifically, a melt 4 of hydrogen absorbing alloy of the composition $LmNi_{4.2}Co_{0.2}Mn_{0.3}Al_{0.3}$ (Lm representing a La-rich mish metal) was supplied from a ladle 3 into a melt pouring nozzle 5 so as to permit the melt 4 to be spurted from the nozzle 5 onto the running surface of a disk-like rotor 2. The spurting rate of the hydrogen absorbing alloy melt 4 from the nozzle 5 and the rotating speed of the disk-like rotor 2 were controlled so as to manufacture spherical particles of the hydrogen absorbing alloy having an average particle diameter of 30 μm.

EXAMPLE 2

Hydrogen absorbing alloy particles were manufactured by using an apparatus constructed as shown in FIG. 3. Specifically, a melt 4 of hydrogen absorption alloy of the composition equal to that in Example 1 was supplied from the ladle 3 into the melt pouring nozzle 5 so as to permit the melt 4 to be spurted from the nozzle 5 onto the running surface of a pulverizing roll 10. The spurting rate of the hydrogen absorbing alloy melt 4 from the nozzle 5 and the rotating speed of the roll 10 were controlled so as to manufacture spherical of the hydrogen absorbing alloy having an average particle diameter of 30 μm.

Control 1

Hydrogen absorbing alloy particles having an average particle diameter of 30 μm were manufactured by mechanically pulverizing in a ball mill a hydrogen absorbing alloy ingot of the composition equal to that in Example 1.

Control 2

Hydrogen absorbing alloy particles having an average particle diameter of 30 μm were manufactured by pulverizing a hydrogen absorbing alloy ingot of the composition equal to that in Example 1. The pulverization was carried out by repeatedly allowing the ingot to absorb and release hydrogen.

The surface state of the hydrogen absorbing alloy particles manufactured in Examples 1, 2 and Controls 1, 2 was observed with SEM. Also, the particle size distribution and yield of these hydrogen absorbing alloy particles were examined.

When it comes to the hydrogen absorbing alloy particles manufactured by using a ball mill as in Control 1, it was found possible to make the alloy particle polyhedral resembling a spherical particle by increasing the pulverizing time. However, the alloy particle manufactured in Control 1 was found to have many edge portions and ridges regardless of the pulverizing time. Also, the hydrogen absorbing alloy particles of Control 1 were found to have a wide particle size distribution, making it necessary to classify the alloy particles with a sieve before preparation of a hydrogen absorbing alloy negative electrode. As a result, the yield was found to be as low as about 40 to 60%, though the yield depends on the pulverizing conditions.

The hydrogen absorbing alloy particles obtained by the method of repeatedly absorbing and releasing hydrogen in Control 2 were found to be pyramidal, and the ridges of the pyramidal particles were clearly recognized. In addition, fine cracks were found on the surfaces of the alloy particles in a greater number than in the alloy particles obtained by the mechanical pulverizing method employed in Control 1. Further, the alloy particles obtained in Control 2 exhibited a wide particle size distribution and the yield after classification of the produced alloy particles was low as in Control 1.

On the other hand, the hydrogen absorbing alloy particles obtained by the rotary disk method and the single roll method in Examples 1 and 2 were found to be spherical and covered with a continuous curved surface which does not have an edge portion and ridges. The surface coarseness of the produced alloy particles was found to be low, and the occurrence of fine cracks on the surfaces of the alloy particles was substantially negligible. Further, the hydrogen absorbing alloy particles obtained in any of Examples 1 and 2 were found to be polycrystalline particles having an average crystal grain diameter of 10 μm. Further, the hydrogen absorbing alloy particles obtained in Examples 1 and 2 were found exhibit a mechanical strength much greater than that of the alloy particles obtained by the pulverizing method in Controls 1 and 2. Still further, the alloy particles of Examples 1 and 2 exhibited a very narrow particle size distribution, making it unnecessary to employ classification after preparation of the alloy particles. In other words, the yield in Examples 1 and 2 was 100%.

EXAMPLE 3

Hydrogen absorbing alloy particles were manufactured by a single roll method shown in FIG. 3. In this experiment, a melt 4 of hydrogen absorbing alloy of the composition similar to that in Example 1 was supplied from the ladle 3 into the melt pouring nozzle 5 so as to permit the melt 4 to be spurted from the nozzle 5 onto the running surface of the atomizing roll 10. The spurting rate of the melt 4 from the nozzle 5 the temperature of the melt 4 and the rotating speed of the roll 10 were controlled appropriately so as to manufacture hydrogen absorbing alloy particles covered with a continuous surface which does not have edge portions and ridges, having an average particle diameter of 30 μm, and having a ratio of the minor axis to the major axis of 1, $\frac{2}{3}$, $\frac{1}{2}$, $\frac{1}{3}$, 1/5 and 1/10. The hydrogen absorbing alloy particles were found to be polycrystalline particles having an average crystal grain diameter of 10 μm.

Various kinds of hydrogen absorbing alloy negative electrodes were prepared by using the hydrogen absorbing alloy particles thus prepared. Specifically, the hydrogen absorbing alloy particles were mixed with carbon black, sodium polyacrylate, polytetrafluoro ethylene (PTFE), carboxymethyl cellulose (CMC) and deionised water. The mixture was kneaded so as to prepare a paste. Then, a layer of the paste thus prepared was formed on a punched metal, followed by drying and pressing the paste layer so as to prepare the desired hydrogen absorbing alloy negative electrode.

The density of the hydrogen absorbing alloy particles was measured for each of the negative electrodes thus prepared. Table 1 shows the results.

TABLE 1

| Minor axis/Major axis of hydrogen absorbing alloy particles | Density (g/cc) of hydrogen absorbing alloy negative electrode |
|---|---|
| 1 | 5.3 |
| 2/3 | 5.0 |
| 1/2 | 5.1 |
| 1/3 | 4.9 |
| 1/5 | 4.6 |
| 1/10 | 3.1 |

Table 1 clearly shows that the density of the hydrogen absorbing alloy negative electrode begins to be lowered when the ratio of the minor axis to the major axis of the hydrogen absorbing alloy particle become smaller than $\frac{1}{2}$, and that the density is rapidly lowered when the ratio noted above becomes smaller than 1/5. It has also been found by an additional experiment that a hydrogen absorbing alloy negative electrode having a practically sufficient density can be obtained by increasing the pressure applied in the pressing step of the paste coating, where ratio of the minor axis to the major axis of the hydrogen absorbing alloy particle falls within the range of between 1/5 and $\frac{1}{2}$. Clearly, it is desirable for the hydrogen absorbing alloy particle to have a ratio of the minor axis to the major axis of 1/5 or more, preferably, $\frac{1}{2}$ or more.

EXAMPLE 4

Hydrogen absorbing alloy particles were manufactured by a rotary disk method shown in FIG. 1. In this experiment, a melt 4 of hydrogen absorbing alloy of the composition similar to that in Example 1 was supplied from the ladle 3 into the melt pouring nozzle 5 so as to permit the melt 4 to be spurted from the nozzle 5 onto the running surface of the disk-like rotor 2. The spurting rate of the melt 4 from the nozzle 5, the rotating speed of the disk-like rotor 2, etc. were controlled appropriately so as to manufacture hydrogen absorbing alloy particles covered with a continuous surface which does not have edge portions and ridges, having an average particle diameter of 0.5 μm, 1 μm, 5 μm, 10 μm, 50 μm, 100 μm, and 500 μm. These hydrogen absorbing alloy particles were found to be polycrystalline particles having an average crystal grain diameter of 10 μm.

Seven kinds of hydrogen absorbing alloy negative electrodes were prepared by using the hydrogen absorbing alloy particles thus prepared. Specifically, the hydrogen absorbing alloy particles were mixed with sodium polyacrylate, PTFE and CMC and, then, with carbon black, followed adding deionised water to the mixture and subsequently kneading the mixture so as to prepare a paste. Then, a layer of the paste thus prepared was formed on a punched metal, followed by drying and pressing the paste layer so as to prepare the desired hydrogen absorbing alloy negative electrode.

On the other hand, a mixture consisting of a nickel hydroxide powder, a cobalt monoxide powder, sodium polyacrylate, CMC and deionised water was kneaded so as to prepare a paste. Then, a layer of the paste was formed on a mesh-like sintered nickel fiber, followed by drying and pressing the paste layer so as to prepare a non-sintered type nickel positive electrode.

The negative and positive electrodes thus prepared were superposed one upon the other with a separator consisting of a polypropylene nonwoven fabric interposed therebetween so as to form a laminate structure. The resultant laminate was spirally wound and accommodated in a bottomed cylindrical enclosure made of a steel. Then, an alkaline electrolyte consisting of a mixed solution of 7N-KOH and 1N-LiOH was poured in the enclosure so as to prepare a nickel-metal hydride secondary cell constructed as shown in FIG. 6. The capacity of the negative electrode was 1.5 times as much as that of the positive electrode, and the discharge capacity of the cell was 1,000 mAh.

Each of the 7 kinds of the nickel-metal hydride secondary cells thus prepared was charged by 150% at 0.3 CmA and, then, discharged at 1.0 CmA. The charging/discharging cycles were repeated until the discharge capacity of the cell was lowered to 80% of the initial value, with the results as shown in Table 2.

TABLE 2

| Average particle diameter of hydrogen absorption alloy particles contained in negative electrode | The number of charging/ discharging cycles of nickel-metal hydride secondary cell |
| --- | --- |
| 0.5 μm | 233 |
| 1 μm | 681 |
| 5 μm | 825 |
| 10 μm | 899 |
| 50 μm | 951 |
| 100 μm | 911 |
| 500 μm | 867 |

Table 2 clearly shows that a life in terms of the number of charging/discharging cycles is short when it comes to a nickel-metal hydride secondary cell comprising a negative electrode containing hydrogen absorbing alloy particles having an average particle diameter of less than 1 μm. On the other hand, the cell voltage is lowered when it comes to a nickel-metal hydride secondary cell comprising a negative electrode containing hydrogen absorbing alloy particles having an average particle diameter of more than 100 μm. The reduction in the cell voltage is prominent particularly where the cell is discharged at a high rate. The reasons for these difficulties are unclear. However, it may be reasonable interpret these difficulties as follows. Specifically, where the average particle diameter of the hydrogen absorbing alloy particles is unduly small, the specific surface area of the alloy particles is markedly increased, with the result that the surfaces of the hydrogen absorbing alloy particles within the negative electrode are considered to be corroded with the alkaline electrolyte during repetition of the charging/discharging cycles. The corrosion is considered to promote the deterioration with time of the cell characteristics, leading to the short life of the secondary cell. On the other hand, where the hydrogen absorbing alloy particles have an of the alloy particles becomes too large. In this case, the area of the interfaces of the hydrogen absorbing alloy particles is diminished. Since the cell reaction within the negative electrode is carried on the interfaces noted above, the polarization is increased during the flow of a large current in the case of using hydrogen absorbing alloy particles having an unduly large average particle diameter so as to bring about reduction in the cell voltage.

EXAMPLE 5

Hydrogen absorbing alloy particles were manufactured by a rotary disk method shown in FIG. 1. In this experiment, a melt 4 of hydrogen absorbing alloy of the composition similar to that in Example 1 was supplied from the ladle 3 into the melt pouring nozzle 5 so as to permit the melt 4 to be spurted from the nozzle 5 onto the running surface of the disk-like rotor 2. The spurting rate of the melt 4 from the nozzle 5, the rotating speed of the disk-like rotor 2, etc. were controlled appropriately so as to manufacture spherical particles of hydrogen absorbing alloy, said particles having an average particle diameter of 30 μm, and the depth of the concave portion or height of the convex portion of the outer surface of the alloy particles of about 0.1 μm, about 0.2 μm, about 1 μm, about 2 μm, about 5 μm and about 10 μm. In other words, these hydrogen absorbing alloy particles exhibited a surface coarseness, determined as the percentage of the depth or height noted above based on the average particle diameter (30 μm), of about 0.3%, about 0.7%, about 1.7%, about 3.3%, about 6.7%, about 16.7% and 33.3%. Further, these hydrogen absorbing alloy particles were found to be polycrystalline particles having an average crystal grain diameter of 10 μm.

A hydrogen absorbing alloy negative electrode was prepared as in Example 4 by using the hydrogen absorbing alloy particles thus prepared. Likewise, a non-sintered type nickel positive electrode was prepared as in Example 4. The negative and positive electrodes thus prepared were superposed one upon the other with a separator interposed therebetween so as to form a laminate structure. The resultant laminate was spirally wound and accommodated in a bottomed cylindrical enclosure. Then, an alkaline electrolyte was poured in the enclosure so as to prepare a nickel-metal hydride secondary cell constructed as shown in FIG. 6. The capacity of the negative electrode was 1.5 times as much as that of the positive electrode, and the discharge capacity of the cell was 1,000 mAh.

Control 3

Hydrogen absorbing alloy particles having an average particle diameter of 30 μm were manufactured by pulverizing a hydrogen absorbing alloy of the composition similar to that in Example 1. A cutter mill was used for the pulverization. When observed with SEM, large number of deep cracks were found on the surfaces of the hydrogen absorbing alloy particles thus manufactured. Also, the depth of the concave portion or the height of the convex portion of the particle surface except the cracks was found to be about 14 μm. In other words, surface coarseness determined in terms of the percentage of the depth or height based on the average particle diameter was about 46.7%.

A hydrogen absorbing alloy negative electrode was prepared as in example 4 by using the hydrogen absorbing alloy particles thus prepared. Likewise, a non-sintered type nickel positive electrode was prepared as in Example 4. The negative and positive electrode thus prepared were superposed one upon the other with a separator interposed therebetween so as to form a laminate structure. The resultant laminate was spirally wound and accommodated in a bottomed cylindrical enclosure. Then, an alkaline electrolyte was poured in enclosure so as to prepare a nickel-metal hydride secondary cell constructed as shown in FIG. 6. The capacity of the negative electrode was 1.5 times as much as that of the positive electrode, and the discharge capacity of the cell was 1,000 mAh.

Each of the nickel-metal hydride secondary cells prepared in Example 5 and Control 3 was charged by 150% at 0.3 CmA and, then, discharged at 1.0 CmA. The charging/discharging cycles were repeated until the discharge capacity of the cell was lowered to 80% of the initial value, with the results as shown in Table 3.

TABLE 3

| Mfg method of hydrogen absorbing alloy particles | Depth or height of concave or convex portion (μm) | Surface coarseness (%) | Charging/ discharging cycles |
| --- | --- | --- | --- |
| Rotary disk method | about 0.1 | about 0.3 | 822 |
| Rotary disk method | about 0.2 | about 0.7 | 897 |
| Rotary disk method | about 0.5 | about 1.7 | 951 |
| Rotary disk method | about 1.0 | about 3.3 | 845 |
| Rotary disk mehtod | about 2.0 | about 6.7 | 820 |
| Rotary disk method | about 5.0 | about 16.7 | 711 |
| Rotary disk method | about 10.0 | about | 508 |

TABLE 3-continued

| Mfg method of hydrogen absorbing alloy particles | Depth or height of concave or convex portion (μm) | Surface coarseness (%) | Charging/ discharging cycles |
| --- | --- | --- | --- |
| Cutter mill method | about 14.0 | 33.3 about 46.7 | 291 |

As apparent from Table 3, a life in terms of the number of charging/discharging cycles is long when it comes to a secondary cell comprising a negative electrode which containing hydrogen absorbing alloy particles having a surface coarseness of 20% or less, i.e., alloy particles covered with a continuous curved surface which does not have edge portions and ridges. On the other hand, the life in terms of the number of charging/discharging cycles is markedly shortened when it comes to a secondary cell comprising a negative electrode which contains hydrogen absorbing alloy particles having a surface coarseness exceeding 20%. The life in terms of the number of charging/discharging cycles is further shortened when it comes to a secondary cell comprising a negative electrode which contains hydrogen absorbing alloy particles manufactured by the conventional cutter mill method. In the negative electrode containing hydrogen absorbing alloy particles having a surface coarseness exceeding 20%, edge portions or ridges clearly appear on the surface of the hydrogen absorbing alloy particles. It follows that current concentration tends to take place during the charging/discharging operations. As a result, the absorption and release of hydrogen are considered to be locally concentrated, leading to promotion of the pulverization of the alloy particles.

It has also been found by an additional experiment that a bad effect is given to the life in terms of the number of charging/discharging cycles of the secondary cell in the case where the cell comprises a negative electrode containing hydrogen absorbing alloy particles including less than 80% of particles having a surface coarseness of 20% or less.

In Examples 1 to 5 described above, a rotary disk method or a single roll method was employed for manufacturing spherical particles of hydrogen absorbing alloy covered with a continuous surface which does not have edge portions and ridges. However, it is also possible to employ a melt rapid cooling method such as a rotary nozzle method, a twin roll method or an inert gas atomizing method for manufacturing spherical particles of hydrogen absorbing alloy covered with a continuous surface which does not have edge portions and ridges, as in Examples 1 to 5. Of course, the spherical hydrogen absorbing alloy particles manufactured by any of these methods are low in the surface coarseness, substantially negligible in the occurrence of micro cracks on the surfaces and, thus, are suitable for use in the manufacture of the hydrogen absorbing alloy negative electrode of a nickel-metal hydride secondary cell.

As described above in detail, the hydrogen absorbing alloy particles of the present invention produce prominent effects as summarized below so as to enable the secondary cell comprising the hydrogen absorbing alloy negative electrode prepared by using the hydrogen absorbing alloy particles of the present invention to exhibit a large cell capacity and a long life in terms of the number of charging/discharging cycles of the cell:

1. The hydrogen absorbing alloy particles are spherical, which are covered with a continuous curved surface which does not have edge portions and ridges, and have an average particle diameter of 1 to 100 μm. Since the alloy particles have a relatively small specific surface area, the surface of the alloy particles contained in the negative electrode ar less likely to be corroded with the alkaline electrolyte housed in the nickel-metal hydride secondary cell.

2. Since the surfaces of the hydrogen absorbing alloy particles have a relatively high mechanical strength, the alloy particles are unlikely to be cracked, making it possible to suppress the pulverization of the alloy particles which accompanies the progress of the charging/discharging cycles of the secondary cell.

3. Since the hydrogen absorbing alloy particles have a high flowability, it is possible to prepare a hydrogen absorbing alloy negative electrode having a high loading density of the alloy particles.

4. Since the hydrogen absorbing alloy particles have a narrow particles size distribution, the alloy particles are prevented from being classified into large and small particle portions in spite of the vibration which takes place during the transportation or in the electrode manufacturing step, making it possible to prepare a hydrogen absorbing alloy negative electrode of a stable quality.

On the other hand, the method of the present invention for manufacturing the hydrogen absorbing alloy particles produces prominent effects, as summarized below:

1. The method of the present invention permits manufacturing spherical hydrogen absorbing alloy particles covered with a continuous curved surface which does not have edge portions and ridges, having an average particle diameter of of 1 to 100 μm, and having a dense surface which is substantially free micro cracks. The alloy particles manufactured by the method of the present invention make it possible to prepare a hydrogen absorbing alloy negative electrode having a high loading density of the hydrogen absorbing alloy particles and a high capacity.

2. The method of the present invention permits manufacturing spherical hydrogen absorbing alloy particles having a narrow particle size distribution, making it unnecessary to apply a classifying treatment to the spherical alloy particles as manufactured. It follows that the manufacturing process can be simplified, and the yield of the hydrogen absorbing alloy particles can be improved.

What should also be noted is that the nickel-metal hydride secondary cell of the present invention comprises a negative electrode containing the hydrogen absorbing alloy particles of the present invention. As pointed out previously, the alloy particles of the present invention permit suppressing the pulverization of the particles derived from the expansion and shrinkage of the alloy particles which accompany the absorption and release of hydrogen during the charging/discharging operations of the secondary cell. The alloy particles also permit suppressing the corrosion with the alkaline electrolyte. It follows that the nickel-metal hydride secondary cell of the present invention exhibits a prominently long life in terms of the number of charging/discharging cycles of the cell and a large cell capacity.

Further, the method of the present invention for manufacturing a nickel-metal hydride secondary cell makes it possible to prepare a negative electrode containing the hydrogen absorbing alloy particles of the present invention without impairing the prominent effects of the alloy particles, i.e., the effect of suppressing the pulverization derived from the expansion and shrinkage of the alloy particles which accompany the absorption and release of hydrogen during the charging/discharging operations of the secondary cell, and the effect of suppressing the corrosion with the alkaline electrolyte. It follows that a nickel-metal hydride secondary cell with an improved life in terms of the number of charging/discharging cycles and a large cell capacity can be manufactured with a high reproducibility.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A nickel-metal hydride secondary cell, comprising:
   a hydrogen absorbing alloy negative electrode accommodated in an enclosure and containing spherical hydrogen absorbing alloy particles covered with a free cooling surface not having edges or ridges and having an average particle diameter of 1 to 100 $\mu$m, wherein at least 70% of said particles have diameters falling within said average particle diameter range ±10%;
   a non-sintered type nickel positive electrode disposed within the enclosure and positioned to face the negative electrode with a separator interposed therebetween; and
   an alkaline electrolyte poured in the enclosure.

2. The secondary cell according to claim 1, wherein the alloy particles include at least 70% of the particles having a ratio of a short diameter to a long diameter of at least $\frac{1}{5}$.

3. The secondary cell according to claim 1, wherein the alloy particles include at least 80% of the particles having a surface coarseness determined such that a depth of the coarseness portion or height of the coarseness portion on an outer surface is 20% or less of the average particle diameter and said depth/height does not exceed 5.0 $\mu$m.

4. The secondary cell according to claim 1, wherein the hydrogen absorbing alloy is represented by the general formula, $XY_{5-a}Z_a$, where "X" represents rare earth elements including La, "Y" denotes Ni, "Z" is at least one element selected from the group consisting of Co, Mn, Al, V, Cu and B, and "a" is $0 \leq a < 2.0$.

5. The secondary cell according to claim 1, wherein the hydrogen absorbing alloy negative electrode is prepared by fixing a composition containing the hydrogen absorbing alloy particles and a binding medium to an electrically conductive core.

6. The secondary cell according to claim 5, wherein the composition is prepared by dispersing the hydrogen absorbing alloy particles and an electrically conductive powder into the binding medium.

7. The secondary cell according to claim 5, wherein the conductive core is a punched metal.

8. The secondary cell according to claim 1, wherein the non-sintered type nickel positive electrode is prepared by fixing a composition having a nickel hydroxide powder dispersed in a binding medium to an electrically conductive core.

9. A nickel-metal hydride secondary cell, comprising:
   a hydrogen absorbing alloy negative electrode accommodated in an enclosure and containing spherical hydrogen absorbing alloy particles prepared by supplying a molten hydrogen absorbing alloy onto a running surface of a rotor rotated at a high speed and disposed under vacuum or under a cooling gas atmosphere;
   a non-sintered type nickel positive electrode disposed within the enclosure and positioned to face the negative electrode with a separator interposed therebetween; and
   an alkaline electrolyte poured in the enclosure.

10. The secondary cell according to claim 9, wherein the hydrogen absorbing alloy is represented by the general formula, $XY_{5-a}Z_a$, where "X" represents rare earth elements including La, "Y" denotes Ni, "Z" is at least one element selected from the group consisting of Co, Mn, Al, V, Cu and B, and wherein "a" is $0 \leq a \leq 2.0$.

11. The secondary cell according to claim 9, wherein the alloy particles have an average particle diameter of 1 to 100 $\mu$m, wherein at least 70% of said particles have diameters falling within said average particle diameter range ±10%.

12. The secondary cell according to claim 9, wherein the alloy particles include at least 70% of the particles having a ratio of a short diameter to a long diameter of at least $\frac{1}{5}$.

13. The secondary cell according to claim 9, wherein the alloy particles include at least 80% of the particles having a surface coarseness determined such that a depth of the coarseness portion or height of the coarseness portion on the outer surface is 20% or less of an average particle diameter and said depth/height does not exceed 5.0 $\mu$m.

14. Hydrogen absorbing alloy particles which are spherical, covered with a free cooling surface not having edges or ridges, and have an average particle diameter of 1 to 100 $\mu$m, wherein at least 70% of said particles have diameters falling within said average particle range ±10%.

15. The hydrogen absorbing alloy particles according to claim 14, wherein the hydrogen absorbing alloy is represented by the general formula, $XY_{5-a}Z_a$ where "X" represents rare earth elements including La, "Y" denotes Ni, "Z" is at least one element selected from the group consisting of Co, Mn, Al, V, Cu and B, "a" is $0 \leq a < 2.0$.

16. The hydrogen absorbing alloy particles according to claim 14, wherein the alloy particles have a ratio of the short diameter to the long diameter of at least 1/5.

17. The hydrogen absorbing alloy particles according to claim 14, wherein the alloy particles include at least 80% of the particles having a surface coarseness determined such that the depth of the concave portion or the height of the convex portion on the outer surface is 20% or less of the average particle diameter and said depth height does not exceed 5.0 $\mu$m.

18. A method of manufacturing a nickel-metal hydride secondary cell comprising the steps of:
   preparing spherical hydrogen absorbing alloy particles covered with a free cooling surface end having an average particle diameter of 1 to 100 $\mu$m by supplying a molten hydrogen absorbing alloy onto the running surface of a rotor rotated at a high speed and disposed under vacuum or under a cooling gas atmosphere so as to permit the melt to be disposed in the form of fine particles by the kinetic energy of the rotor and, at the same time, rapidly cooling and solidifying the fine particles;

preparing a paste by kneading a mixture of the hydrogen absorbing alloy particles and a binding medium without exposing the hydrogen absorbing alloy particles to the air atmosphere:

preparing a hydrogen absorbing alloy negative electrode by forming a layer of the paste on an electrically conductive core, followed by loading, drying and, then, applying roller press to the paste layer;

preparing a non-sintered type nickel positive electrode by dispersing a nickel hydroxide powder into a binding medium so as to prepare a paste, followed by forming a layer of the paste on an electrically conductive core and subsequently loading and drying the paste layer;

accommodating a laminate consisting of the hydrogen absorbing alloy negative electrode, the non-sintered type nickel positive electrode and a separator interposed between the negative and positive electrodes in an enclosure; and pouring an alkaline electrolyte in the enclosure.

19. The method of manufacturing a nickel-metal hydride secondary cell according to claim 18, wherein the hydrogen absorbing alloy is represented by the general formula, $XY_{5-a}Z_a$, where "X" represents rare earth elements including La, "Y" denotes Ni, "Z" is at least one element selected from the group consisting of Co, Mn, Al, V, Cu and B, and "a" is $0 \leq a < 2.0$.

20. The method of manufacturing a nickel-metal hydride secondary cell according to claim 18, wherein the composition is prepared by dispersing the hydrogen absorbing alloy particles and an electrically conductive powder into the binding medium.

21. The method of manufacturing a nickel-metal hydride secondary cell according to claim 18, wherein the conductive core is a punched metal.

22. A method of manufacturing hydrogen absorbing alloy particles for a cell, comprising the steps of:

preparing a melt of a hydrogen absorbing alloy; and supplying the melt of the hydrogen absorbing alloy onto the running surface of a rotor rotated at a high speed and disposed under vacuum or under a cooling gas atmosphere so as to permit the melt to be disposed in the form of fine particles by the kinetic energy of the rotor and, at the same time, to be rapidly cooled and solidified.

23. The method according to claim 22, wherein the hydrogen absorbing alloy is represented by the general formula, $XY_{5-a}Z_a$, where "X" represents rare earth elements including La, "Y" denotes Ni, "Z" is at least one element selected from the group consisting of Co, Mn, Al, V, Cu and B, and "a" is $0 \leq a < 2.0$.

* * * * *